United States Patent
Peterson et al.

(10) Patent No.: US 6,705,125 B2
(45) Date of Patent: Mar. 16, 2004

(54) REDUCTION OF DAMAGE INITIATION DENSITY IN FUSED SILICA OPTICS VIA UV LASER CONDITIONING

(75) Inventors: John E. Peterson, Livermore, CA (US); Stephen M. Maricle, San Lorenzo, CA (US); Raymond M. Brusasco, Livermore, CA (US); Bernardino M. Penetrante, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 28 days.

(21) Appl. No.: 09/916,847

(22) Filed: Jul. 26, 2001

(65) Prior Publication Data

US 2002/0046579 A1 Apr. 25, 2002

Related U.S. Application Data

(60) Provisional application No. 60/242,496, filed on Oct. 23, 2000.

(51) Int. Cl.[7] ............................................. C03B 32/00
(52) U.S. Cl. .......................... 65/392; 65/386; 65/425; 65/111; 359/350
(58) Field of Search .......................... 65/386, 392, 425, 65/111; 359/350

(56) References Cited

U.S. PATENT DOCUMENTS

| | | | | |
|---|---|---|---|---|
| 3,999,865 A | | 12/1976 | Milam et al. ................ 356/239 |
| 4,667,101 A | | 5/1987 | Siekhaus ..................... 250/307 |
| 5,086,352 A | | 2/1992 | Yamagata et al. .......... 359/350 |
| 5,325,230 A | * | 6/1994 | Yamagata et al. .......... 359/350 |
| 5,410,428 A | | 4/1995 | Yamagata et al. .......... 359/350 |
| 5,472,748 A | * | 12/1995 | Wolfe et al. ................. 427/554 |
| 5,616,159 A | * | 4/1997 | Araujo et al. ................. 65/17.4 |
| 5,697,998 A | | 12/1997 | Platus et al. .................. 65/104 |
| 5,796,523 A | | 8/1998 | Hall ............................ 359/629 |
| 6,058,739 A | * | 5/2000 | Morton et al. ............... 65/30.1 |
| 6,099,389 A | | 8/2000 | Nichols et al. ............... 451/36 |
| 6,205,818 B1 | * | 3/2001 | Seward, III ................... 65/33.2 |
| 2002/0046579 A1 | | 4/2002 | Peterson et al. | |

OTHER PUBLICATIONS

F.Y. Genin, et al., "Catastrophic Failure of Contaminated Fused Silica Optics at 355 nm," UCRL–JC–125417 Preprint, Dec. 3, 1996, 11 pgs.

* cited by examiner

*Primary Examiner*—James Derrington
(74) *Attorney, Agent, or Firm*—Eddie E. Scott; Alan H. Thompson (57) ABSTRACT

The present invention provides a method for reducing the density of sites on the surface of fused silica optics that are prone to the initiation of laser-induced damage, resulting in optics which have far fewer catastrophic defects and are better capable of resisting optical deterioration upon exposure for a long period of time to a high-power laser beam having a wavelength of about 360 nm or less. The initiation of laser-induced damage is reduced by conditioning the optic at low fluences below levels that normally lead to catastrophic growth of damage. When the optic is then irradiated at its high fluence design limit, the concentration of catastrophic damage sites that form on the surface of the optic is greatly reduced.

21 Claims, 7 Drawing Sheets

REDUCTION OF DAMAGE INITIATION DENSITY IN FUSED SILICA OPTICS VIA UV LASER CONDITIONING

CROSS-REFERENCE TO RELATED APPLICATIONS

Related subject matter is disclosed and claimed in the following commonly owned, copending, U.S. Patent Application, U.S. Provisional Application No. 60/242,496 by Raymond M. Brusasco, Bernardino M. Penetrante, James A. Butler, Walter Grundler, and George K. Governo, filed Oct. 23, 2000, and entitled "CO2 Laser and Plasma Microjet Process for Improving Laser Optics," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to optics and more particularly to the reduction of damage in optics.

2. State of Technology

The abstract of U.S. Pat. No. 3,999,865 for method and apparatus for determining the mechanism responsible for laser-induced damage by Milam, et al, issued Dec. 28, 1976, provides the following description, "A system is described for determining the mechanism responsible for laser-induced damage in a sample which utilizes a procedure of sequentially irradiating a large number of sites using a tightly focused laser beam whose intensity is constant in time. A statistical analysis of survival times yields a determination that damage was due to one of the following mechanisms: 1. linear absorption, 2. nonlinear absorption, 3. absorbing inclusions, 4. mechanical defects, or 5. electron-avalanche breakdown."

The abstract of U.S. Pat. No. 4,667,101 for predicting threshold and location of laser damage on optical surfaces by Wigbert Siekhaus, patented May 19, 1987 provides the following description, "An apparatus useful in the prediction of the damage threshold of various optical devices, the location of weak spots on such devices and the location, identification, and elimination of optical surface impurities comprising, a focused and pulsed laser, an photo electric detector/imaging means, and a timer. The weak spots emit photoelectrons when subjected to laser intensities that are less than the intensity actually required to produce the damage. The weak spots may be eliminated by sustained exposure to the laser beam."

The abstract of U.S. Pat. No. 5,086,352 for optical members and blanks or synthetic silica glass and method for their production by Yamagata et al, patented Feb. 4, 1992 provides the following description: "The invention relates to lenses, prisms or other optical members which are subjected to high-power ultraviolet light having a wavelength of about 360 nm or less, or ionizing radiation, particularly optical members for use in laser exposure apparatus for lithography, and to blanks for such optical members. The homogeneity of the refractive index distribution and the resistance to optical deterioration when the optical members are exposed for a long period of time to short wavelength ultraviolet light from a laser beam are improved. The optical members are made of high-purity synthetic silica glass material containing at least about 50 wt. ppm of OH groups, and are doped with hydrogen. The refractive index distribution caused by the fictive temperature distribution during heat treatment in the process of producing high-purity silica glass blanks for optical members in accordance with the present invention is offset by the refractive index distribution determined by the OH group concentration distribution or by the OH group concentration distribution and the Cl concentration distribution in the glass."

The abstract of U.S. Pat. No. 5,325,230 for optical members and blanks of synthetic silica glass and method for their production by Yamagata et al, patented Jun. 28, 1994, provides the following description: "The invention relates to lenses, prisms or other optical members which are subjected to high-power ultraviolet light having a wavelength of about 360 nm or less, or ionizing radiation, particularly optical members for use in laser exposure apparatus for lithography, and to blanks for such optical members. The homogeneity of the refractive index distribution and the resistance to optical deterioration when the optical members are exposed for a long period of time to short wavelength ultraviolet light from a laser beam are improved. The optical members are made of high-purity synthetic silica glass material containing at least about 50 wt. ppm of OH groups, and are doped with hydrogen. The refractive index distribution caused by the fictive temperature distribution during heat treatment in the process of producing high-purity silica glass blanks for optical members in accordance with the present invention is offset by the combined refractive index distribution determined by the OH group concentration distribution or by the OH group concentration distribution and the Cl concentration distribution in the glass."

The abstract of U.S. Pat. No. 5,410,428 for Optical member made of high-purity and transparent synthetic silica glass and method for production thereof or blank thereof by Yamagata et al, patented Apr. 25, 1995, provides the following description: "This invention relates to an optical member made of highly transparent, high-purity synthetic silica glass, to a method for manufacturing a blank or an optical member of such glass, and to the optical members themselves. The optical members have an absolute refractive index, nd, of 1.460 or more and a hydrogen molecule concentration of at least $5 \times 10^{16}$ molecules/cm$^3$ uniformly distributed throughout the glass and are particularly well suited for use in apparatus in which they are exposed to a high-power laser beam such as that produced by an excimer laser."

The abstract of U.S. Pat. No. 5,472,748 for permanent laser conditioning of thin film optical materials by Wolfe et al, patented Dec. 5, 1995 provides the following description: "The invention comprises a method for producing optical thin films with a high laser damage threshold and the resulting thin films. The laser damage threshold of the thin films is permanently increased by irradiating the thin films with a fluence below an unconditioned laser damage threshold."

The abstract of U.S. Pat. No. 5,616,159 for a method of forming high purity fused silica having high resistance to optical damage by Araujo et al, patented Apr. 1, 1997, provides the following description, "High purity fused silica glass which is highly resistant to optical damage by ultraviolet radiation in the laser wavelength of about 300 nm or shorter is produced. In particular, a fused silica optical member or blank exhibits substantially no optical damage up to 107 pulses (350 mJ/cm$^2$) at the KrF laser wavelength region of about 248 nm, and at the ArF laser wavelength region of about 193 nm."

The abstract of U.S. Pat. No. 5,697,998 for sapphire window laser edge annealing by Daniel H. Platus et al, patented Dec. 16, 1997, provides the following description, "A sapphire window is laser edge annealed using a CO2 laser spot illuminating along a path following the edge of the window so as to heat the edges to remove or reduce sub surface defects which can cause stress fractures."

The abstract of U.S. Pat. No. 5,796,523 for a laser damage control for optical assembly by John M. Hall, patented Aug. 18, 1998 provides the following description, "An optical assembly and technique for magnified viewing which includes innal damaging laser energy protection. An objective lens subassembly is positioned on the focal axis which focuses incoming light energy over an entire field of view. An optical prism accepts the focused light energy and reorients the focused light energy which is split by a beamsplitter onto a power limiter at the intermediate focal plane so that only energy under an approximate damage threshold is allowed to pass onward. The optical assembly can provide from 4× to a 10× power magnification with up to a 60 millimeter entrance pupil diameter with internal, multi-spectral damaging laser energy protection."

The abstract of U.S. Pat. No. 6,099,389 for fabrication of an optical component by Nichols et al, patented Aug. 8, 2000 provides the following description: "A method for forming optical parts used in laser optical systems such as high energy lasers, high average power lasers, semiconductor capital equipment and medical devices. The optical parts will not damage during the operation of high power lasers in the ultra-violet light range. A blank is first ground using a fixed abrasive grinding method to remove the subsurface damage formed during the fabrication of the blank. The next step grinds and polishes the edges and forms bevels to reduce the amount of fused-glass contaminants in the subsequent steps. A loose abrasive grind removes the subsurface damage formed during the fixed abrasive or "blanchard" removal process. After repolishing the bevels and performing an optional fluoride etch, the surface of the blank is polished using a zirconia slurry. Any subsurface damage formed during the loose abrasive grind will be removed during this zirconia polish. A post polish etch may be performed to remove any redeposited contaminants. Another method uses a ceria polishing step to remove the subsurface damage formed during the loose abrasive grind. However, any residual ceria may interfere with the optical properties of the finished part. Therefore, the ceria and other contaminants are removed by performing either a zirconia polish after the ceria polish or a post ceria polish etch."

The abstract of U.S. Pat. No. 6,205,818 for production of fused silica having high resistance to optical damage by Thomas P. Seward III, patented Mar. 27, 2001 provides the following description, "A method of rendering fused silica resistant to compaction caused by UV laser beam irradiation. The method of the invention results in a fused silica member that is desensitized to compaction caused by the long-term exposure to UV laser beams. The invention includes a means to pre-compact fused silica members using high energy radiation."

SUMMARY OF THE INVENTION

The present invention provides a method of reducing the initiation of catastrophic damage on the surface of fused silica optics by conditioning the optic at low fluences below levels that normally lead to catastrophic growth of damage. When the optic is then irradiated at its high fluence design limit, the concentration of catastrophic damage sites that form on the surface of the optic is greatly reduced. The present invention provides a method of conditioning fused silica optics to reduce damage when said fused silica optics is operated in an environment where it will be exposed to high-power ultraviolet light. The fused silica optics is irradiated in successive irradiating steps in ramp-like fashion. The fused silica optics is irradiated with successive irradiating steps applied in increasingly higher fluences. In one embodiment of the present invention, the step of irradiating the fused silica optics with a conditioning laser beam of about 360 nm wavelength or less is conducted with a conditioning laser beam with a wavelength in the range of 360 nm to 150 nm. In another embodiment of the present invention the step of irradiating the fused silica optics with a conditioning laser beam of about 360 nm wavelength or less is conducted with a conditioning laser beam of approximately 355 nm. In another embodiment of the present invention the fused silica optics is conducted with substantially less than the fluence that could cause more than half the density of catastrophic damage sites in an unconditioned optic. In another embodiment of the present invention successive irradiating steps are continued until the density of catastrophic damage on the fused silica optics is expected to be reduced by at least a factor of 2.

A feature of the invention is to reduce of initiation of catastrophic damage on the surface of fused silica optics, such that the optics can survive prolonged exposure to high-power laser beams having an ultraviolet wavelength of about 360 nm or less.

Another feature of the invention is to substantially improve the resistance to optical deterioration of already manufactured optical components made of fused silica, such that these optical components can survive prolonged exposure to high-power ultraviolet irradiation. The invention enables such improvement in the optical components with minimum or no change in the manufacturing process for said optical components.

Another feature of the invention is to substantially improve the resistance to optical deterioration of high-energy laser components made of fused silica for applications to UV/DUV/EUV lithography, especially in semiconductor manufacturing.

Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the drawings, to the following description, and to incorporated information; a detailed description including specific embodiments of the invention are described. The detailed description of the specific embodiments, together with the general description of the invention, serve to explain the principles of the invention. The present invention provides a system for conditioning fused silica optics to reduce damage when said fused silica optics are operated in an environment where they will be exposed to high-power ultraviolet light having a wavelength of about 360 nm or less. The fused silica optics is irradiated with a laser beam of about 360 nm wavelength or less. The wavelength ranges from about 360 nm down to about 150 nm, such as would be produced, for example, by a YAG third harmonic (355 nm) laser beam, a YAG fourth harmonic (250 nm) laser beam, a XeF excimer laser beam (351 and 353 nm), a KrF excimer laser beam (248 nm), a XeCl laser beam (308 nm), and an ArF excimer laser beam (193 nm). The fused silica optics is irradiated in successive irradiating steps in ramp-like fashion. The fused silica optics is irradiated with successive irradiating steps applied in increasingly higher fluences. In an embodiment of the system the fused silica optics is irradiated with a laser beam in the range of 360 nm to 150 nm wavelength. In another embodiment of the system the fused silica optics is irradiated with a laser beam of approximately 355 nm.

High power is defined as the level of power sufficient to initiate damage, or cause the growth of existing damage, on an irradiated optic with a probability of 0.001 percent or greater. For example, if the total number of irradiated laser pulses over a given area of an optic at a certain power is $10^6$ (1 million), then the power is high if 10 of those laser pulses cause damage anywhere over that area. Another example, if it is desired that an optic survive exposure for a total number of $10^6$ laser pulses, then the power is high if the first damage occurs before $10^5$ pulses. Another example, if an optic is being irradiated over an area of 1000 cm$^2$, then the power is high if the area of initiated damage or grown damage on the optic is 0.01 cm$^2$ or larger.

An embodiment of the present invention provides a method of reducing the initiation of laser-induced damage on the surface of fused silica optics in environments where they are exposed to high-power ultraviolet light having a wavelength of about 360 nm or less, e.g. a YAG third harmonic (355 nm, oftentimes referred to as 3ω) laser beam, an excimer laser beam, or some other high-power ultraviolet laser beam such as that intended for the National Ignition Facility. More specifically, the embodiment of the present invention relates to methods for reducing the initiation of surface damage sites that lead to catastrophic failure of the fused silica optics. Further, the embodiment of the present invention relates to significantly increasing the lifetime of finished products, such as lenses, that have already been finally polished and ready for assembly in an apparatus that uses a high-power ultraviolet laser beam.

The sustained performance of high peak power lasers, such as those used for fusion research, is limited by the damage of optical components that comprise the laser chain. The damage initiates in small size, on the order of tens of microns, depending on the peak fluence of the laser. The growth of the damage is exponential in number of shots and can create excessive scatter and beam modulation. Replacing the damaged optics is an option for sustained performance of the laser system, but this option is very expensive. Therefore, a method of reducing or eliminating the number of sites that initiate damage is needed. A method of reducing or eliminating the catastrophic growth of the damage sites is also desirable.

The largest and most powerful lasers designed for achieving thermonuclear ignition will operate with wavelengths ranging from the infrared (1060 nm wavelength) to the ultraviolet (355 nm wavelength). In the final optics stage, the infrared beams will be converted to ultraviolet beams, and then focused to the target. The final optics will be irradiated by a distribution of fluences, peaking at a fluence of about 15 J/cm$^2$, 3 nanosecond pulse duration at 355 nm wavelength. Fluence is defined in the specification and claims for a pulsed laser of a specified wavelength and specified pulse length as the energy per unit area delivered by a single pulse.

Optical components, particularly made of fused silica, are essential for shaping the laser beams and delivering these beams to the target. These optics suffer from weakened areas that are prone to damage at the laser fluences contemplated in the aforementioned laser systems. Damage can occur at the fundamental laser wavelength of 1060 nm and, especially, at the tripled wavelength of 355 nm. There are two options that would enable continued use of the optics. One option is to mitigate the growth of the damage sites before they can create excessive scatter and beam modulation. The other option is to drastically reduce the initiation of damage sites that lead to catastrophic growth.

A typical means of specifying the laser power handling capability of an optic is to make a determination of its laser damage threshold. Such a threshold is defined as the level of power, and more specifically the fluence, at which any modification of the optic surface or bulk occurs as a result of the passage of the laser pulse. Scientific study of the mechanism and manifestations of laser damage are ongoing. For example, in U.S. Pat. No. 3,999,865, issued Dec. 28, 1976, Milam, et al. describes a system for determining the mechanism responsible for laser-induced damage in a sample which utilizes a procedure of sequentially irradiating a large number of damage sites using a tightly focused laser beam whose intensity is constant in time. A statistical analysis of survival times then yields a determination that damage was due to one of the following mechanisms: 1. linear absorption, 2. nonlinear absorption, 3. absorbing inclusions, 4. mechanical defects, or 5. electron-avalanche breakdown. However, a method for reducing the initiation of damage sites or mitigating the growth of existing damage sites is not provided.

Several researchers have previously reported that the damage thresholds of some optical materials for a particular laser could be increased by first illuminating the optical materials with sub-threshold fluences of the same laser. In U.S. Pat. No. 5,472,748, issued Dec. 5, 1995, Wolfe et al. describe a method for permanently increasing the laser damage threshold of multilayer dielectric coatings by irradiating with a sub-damaging fluence at the operational wavelength of 1060 nm. However, it is not apparent that such a procedure would work for the fused silica component particularly at the ultraviolet wavelength of 355 nm. Similarly, in U.S. Pat. No. 4,667,101, issued May 19, 1987, Siekhaus describes an apparatus for identifying and locating weak spots that could potentially lead to laser-induced damage by subjecting the material to laser intensities that are less than the intensity actually required to produce the damage, and notes that these weak spots may be eliminated by sustained exposure to the laser beam. Siekhaus also notes the possible use of the apparatus for cleansing the optical surface of impurities that could potentially lead to damage. However, because there are many possible mechanisms that lead to damage, as discussed by Milan et al. in U.S. Pat. No. 3,999,865, it is not apparent that the apparatus described by Siekhaus in U.S. Pat. No. 4,667,101 will be able to significantly reduce the initiation of damage sites when a finished fused silica optic is exposed to a high-power ultraviolet laser.

The method of increasing laser damage threshold by irradiating with a sub-damaging fluence is not a new phenomenon and is commonly known as laser conditioning. The laser wavelength, material identity and material disposition play important roles in determining whether laser conditioning occurs and the degree to which it occurs.

Virtually all references in the literature dealing with laser conditioning consider the conditioning phenomenon using the 1064 nm laser wavelength. This wavelength is in the infrared region of the electromagnetic spectrum, whereas, in our invention, the wavelength of interest is in the ultraviolet portion. The effect of wavelength is a very important parameter in determining whether there can be a conditioning effect. In fact, there is evidence to show that a laser conditioning effect using shorter wavelengths would not be seen. Arenberg and Mordaunt ["Experimental Investigation of the Role of Wavelength in the Laser Conditioning Effect," Nat. Inst. Stand. & Tech. (US.) Spec. Pub. 756, Oct. 1987 pp. 516–518] had reported that laser conditioning has been observed for an optic for 1064 nm wavelength exposure but that an increase in the laser damage threshold at the shorter 532 nm wavelength had not been observed. One would conclude from this fact that decreasing the wavelength to produce the conditioning effect would not be efficacious.

In U.S. Pat. No. 6,205,818, Mar. 27, 2001, Seward describes a method of rendering fused silica resistant to compaction caused by ultraviolet laser beam irradiation. The method makes the clear distinction between two types of laser damage—those associated with absorption and those associated with compaction. The concern in U.S. Pat. No. 6,205,818 is focussed upon the latter form of damage, with specific concern about the birefringence of the silica optic and the transmitted wavefront alterations produced after use at wavelengths shorter than the one contemplated in the present invention. In the present invention, laser damage concerns are entirely dominated by the former type of laser damage, namely absorption. Catastrophic damage is presumed to be associated with absorbing centers or multiphoton effects associated with defective regions, not with compacted regions. Furthermore, the specific remedy called out in U.S. Pat. No. 6,205,818 suggests an exposure to a laser beam with a fluence higher than the one anticipated under normal operating circumstances. One cannot apply this type of remedy in our case because to do so would quickly result in catastrophic damage to the optic. The treatment methodology in the present invention provides for sub-damage threshold illumination with an ultraviolet laser beam, up to the level of the operating fluence. In the detailed description of the present invention, this method will be shown to be very effective based on the data accompanying the invention description.

The material to be conditioned plays a role in determining whether laser conditioning occurs and the degree to which it occurs. Virtually all of the references in the literature involving laser conditioning focus attention on the treatment of dielectric multilayers, as in U.S. Pat. No. 5,472,748, issued Dec. 5, 1995, by Wolfe et al. Such multilayers involve stacks of silica and other crystalline materials with a higher index of refraction, such as hafnia, zirconia, titania and the like. Laser damage in these multilayers has been correlated with nodule defects, stemming chiefly from the deposition parameters associated with the high index component. It would be natural to assume then that laser conditioning to improve the laser damage performance of these multilayers would be somehow associated with these nodule defects. However, in bulk fused silica, these defects are not present. Therefore, the main mechanism for laser conditioning cannot exist and it then becomes difficult to imply in an obvious manner that laser conditioning, in any form, can take place for bulk fused silica. Runkel et al. ["Laser conditioning study of KDP on the Optical Sciences Laser, using large area beams," Proc. SPIE-Int. Soc. Opt. Eng. (1998), 3244; Laser-Induced Damage in Optical Materials: 1997, 51–63] discusses laser conditioning for bulk materials, but the reference is only for crystalline potassium dihydrogen phosphate (KDP) crystals and not amorphous fused silica. It remains non-obvious that laser conditioning for bulk fused silica is a viable method of ameliorating laser damage issues in that material.

All previous studies of laser conditioning deal with its effect on the laser damage threshold. A functional or practical measure of the laser power handling capability of an optic should take into consideration the severity of the laser damage and its scope in terms of the concentration of damage sites on the optic surface. For example, small damage sites that do not grow and are limited to a very small fraction of the optic surface would be a damaged optic in the classic, absolute sense but may be acceptable for use in a functional or practical sense. The presentation, "Catastrophic failure of contaminated fused silica optics at 355 nm" by Genin et al., presented at 2nd Annual International Conference on Solid-State Lasers for Applications to Inertial Confinement Fusion, Paris, France, Oct. 22–25, 1996 describes a study of failure of contaminated fused silica optics at 355 nm.

There are many avenues that can be used to increase the laser power handling capability of an optic. These methods include, but are not limited to: (1) fabrication process improvements, (2) use of alternate materials, and (3) post-fabrication treatment or mitigation techniques. Investigations on material properties and process improvements are numerous and many are within the purview of vendors of optical components. In U.S. Pat. No. 6,099,389, issued Aug. 8, 2000, Nichols et al. describe a method for improving the grinding and polishing of optical parts that minimizes damage during the operation of high power lasers in the ultraviolet range. In U.S. Pat. No. 5,325,230, issued Jun. 28, 1994, Yamagata et al. describes a method for making optical components from a special composition of high-purity synthetic silica that are able to withstand prolonged exposure to high-power ultraviolet light. Fabrication process improvements, such as those disclosed in U.S. Pat. No. 6,099,389 and U.S. Pat. No. 5,325,230, relate to semi-finished products that have not been finally polished. In contrast, the present invention relates to a post-fabrication treatment technique that significantly increases the lifetime of finished products, such as lenses, that have already been finally polished and ready for assembly in an apparatus that uses a high-power ultraviolet laser beam.

Methods for reducing the initiation of damage sites that lead to catastrophic failure of the fused silica optics are of critical importance to the high-energy fusion laser community. They are also of critical importance to the multi-billion dollar semiconductor capital equipment market. In the lithography equipment for manufacturing of silicon chips, ultraviolet light in the range of 340–360 nm is primarily used. However, manufacturers would like to use shorter wavelengths such as 193 nm and 248 nm. These wavelengths are becoming common in biomedical devices as well. All of these wavelengths are produced by a series of ultraviolet lasers and images through fused silica optics. Unfortunately, no suitable post-fabrication treatment methods have been shown to significantly reduce the initiation of damage sites when fused silica optics are exposed to high-power lasers at these wavelengths.

The present invention renders the optic more amenable to post-fabrication treatment or mitigation and substantially improves the response of the fused silica optic to high levels of UV laser power. The present invention provides a form of UV laser conditioning. In one embodiment it uses a schedule of repeated exposure of an optic to laser light intensities below that which produces irreversible changes to the optic. Such exposure results in an optic with substantially improved properties with respect to laser power handling capability.

In the embodiment, the system consists of irradiating the surface of a laser optic with laser light at or near 355 nanometers at a fluence level below that which produces any detectable, irreversible change in the surface of said optic. Irradiation continues at successively increasing fluence levels up to the desired operating level of 12–14 J/cm$^2$. Fluence is defined in the specification and claims for a pulsed laser of a specified wavelength and specified pulse length as the energy per unit area delivered by a single pulse. In the drawings and description, the fluence corresponds to a pulsed laser of a wavelength of 355 nm (sometimes referred to as "3ω") and a pulse length of 3 ns.

A typical means of specifying the laser power handling capability of an optic is to make a determination of its laser damage threshold. Such a threshold is defined as the level of fluence at which any modification of the optic surface or bulk occurs as a result of the passage of the laser pulse. There are four main types of illumination sequences that are used to determine laser damage thresholds. These are referred to by those skilled in the art as 1-on-1, S-on 1, N-on-1 and R-on-1 damage test types. The 1-on-1 test sequence irradiates a site with only one laser shot. The S-on-1 test sequence irradiates a site with several hundred shots at an equal fluence. The N-on-1 test sequence increments the fluence on a site in a step like manner, with a significant time period between each step. The R-on-1 test slowly increments the fluence, in a ramped manner, on a single site over several hundred shots. Both the S-on-1 and R-on-1 tests are done with only 100 ms between each laser pulse. All previous studies of laser conditioning deal with its effect on the laser damage threshold as measured by one of these four types of illumination sequences. In these tests, the many individual test sites are well separated. A curve of cumulative damage probability versus laser fluence is found from the ratio of the number of sites that damage below a certain fluence to the total number of test sites. A laser beam with a diameter of about 1 mm is typically used. Because each test site is only as big as the laser beam diameter, these tests can be done with small optics samples and are very quick for quickly screening the effectiveness of any process for improving the optic. However, these tests sample only a very small fraction of the area of the optic, and appreciable damage information can be obtained only at fluences much higher than those appropriate for large optics under realistic operating conditions.

A functional or practical measure of the laser power handling capability of an optic should take into consideration the severity of the laser damage and its scope in terms of the concentration of damage sites on the optic surface. The preferred procedure for characterizing the laser power handling capability of a large optic is to measure the curve of damage concentration versus fluence. The damage concentration is the ratio of the number of damage sites produced to the area irradiated at a fixed fluence. A relatively much larger area of the optic has to be tested to get an accurate count of the damage concentration at each fluence. Such a large area can be tested by using a laser beam with a large beam diameter, or by raster scanning a small-diameter laser beam over a large area of the optic.

Figure 1:
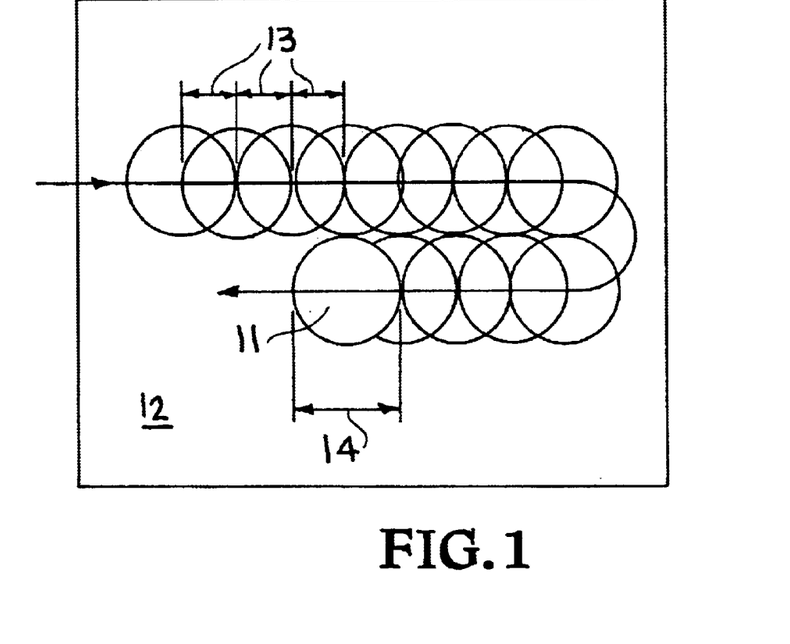
FIG. 1. is an illustration of the raster scan procedure used for laser conditioning the optic at low fluence and initiating laser-induced damage sites at high fluence.

FIG. 1 illustrates the raster scan procedure used in an embodiment of the present invention for laser conditioning the optic at low fluence and initiating laser-induced damage sites at high fluence. Raster scanning involves scanning a small diameter laser beam 11 over an area of the optic 12. The beam is stepped 13 a fraction of a beam diameter in making the raster scan, preferably with a beam overlap equal to or greater than 50% full-width half maximum (FWHM) 14. During conditioning, the optic is raster scanned in a series of increasing fluence levels. Initiation of laser-induced damage sites is performed by raster scanning once at the desired high fluence.

Figure 2:
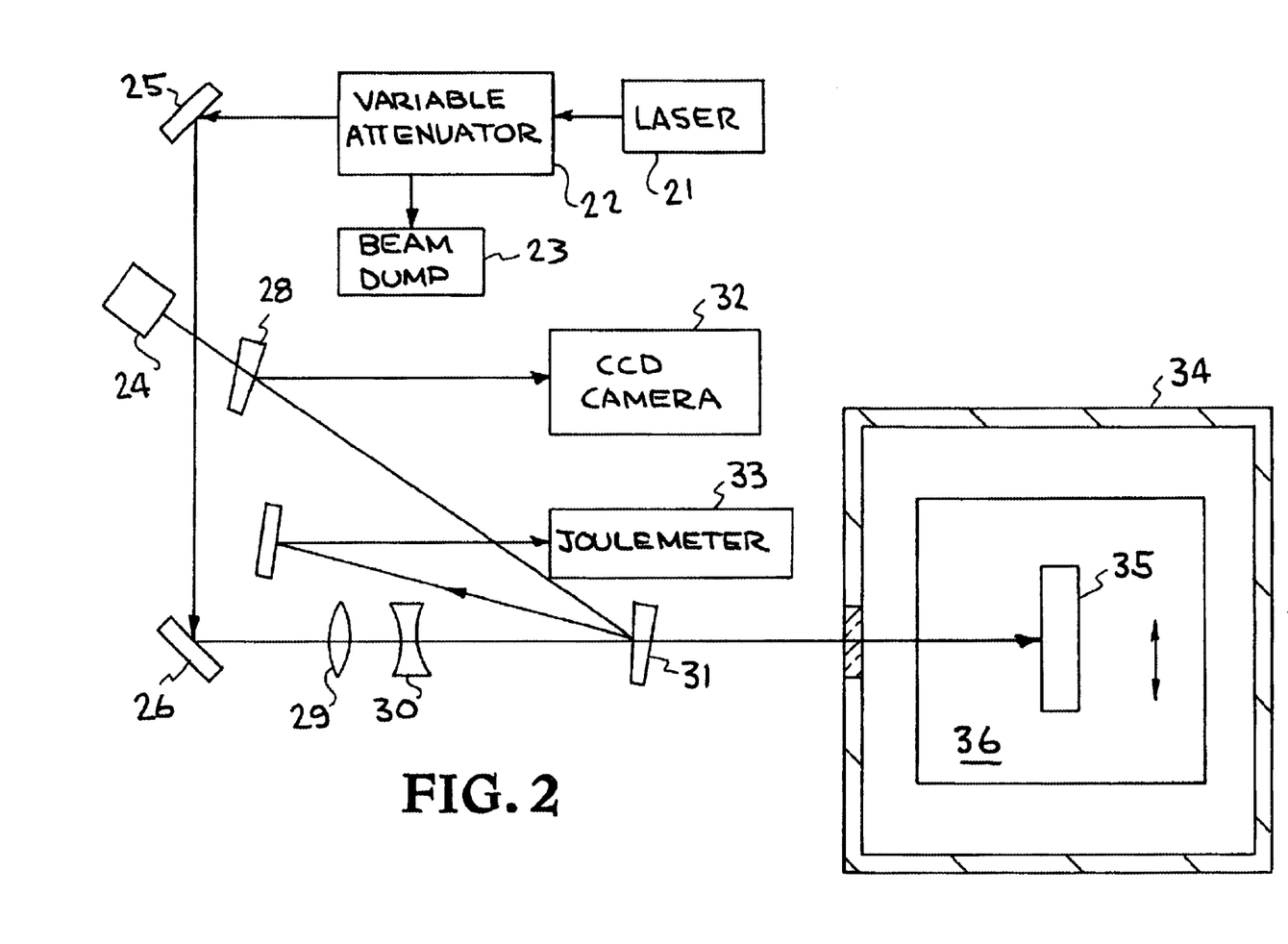
FIG. 2. is an illustration of an apparatus used for laser conditioning and initiation of damage sites on a large-aperture optic by rastering with a small beam.

FIG. 2 is an illustration of an apparatus used for laser conditioning and initiation of damage sites on a large-aperture optic by rastering with a small beam. The apparatus in general is designated by the reference numeral 20. The laser 21 used for both the conditioning and the damage initiation is a tripled Nd:YAG operating at a wavelength of 355 nm and a 10 Hz rep-rate. A variable attenuator 22 allows the laser energy to change from nearly zero up to the maximum available, the unwanted laser energy being directed to a beam dump 23. The beam is transported by a series of mirrors 25, 26 and then is focused by focusing optics 29, 30 down to a 0.7–0.8 mm, 50% FWHM beam diameter. Laser fluence is measured by directing a fraction of the beam using a sampling wedge 31 and a series of mirrors 27, 28 in an equivalent sample plane to a beam profiler with CCD camera 32 and a joulemeter 33. The optic is placed on a translational stage 36, capable of moving a meter-scale optic 35 weighing up to 400 pounds. The entire translation stage and damage detection system is covered by a class 100 cleanroom 34. The optic is monitored for damage using a white-light scatter detection system. This scatter system measures the intensity of scattered light before and after each raster scan by the laser. By subtracting the before measurement from the after, scatter changes caused by the laser damage can be detected. The scatter system is able to detect damage sites with diameters as small as 5 microns. A telescope with magnification of 60× is also used to examine the damage sites on the optic.

FIG. 3 to FIG. 6 show various conditioning methodologies that have been discovered in this invention to be effective in reducing the initiation of damage sites on a fused silica optic.

Figure 3:
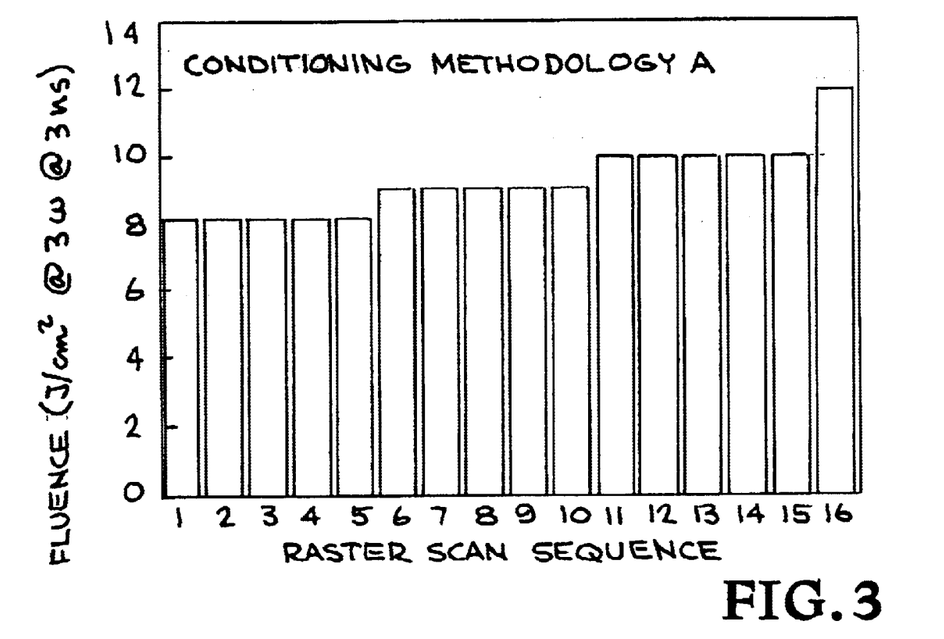
FIG. 3 is a graph showing conditioning methodology A.

FIG. 3 is a graph showing conditioning methodology A. Methodology A is a four-step raster-conditioning process where the optic area of interest is exposed to five raster scans at a fluence of 8 J/cm$^2$, then five raster scans at 9 J/cm$^2$, then five raster scans at 10 J/cm$^2$, and finally tested for damage at 12 J/cm$^2$.

Figure 4:
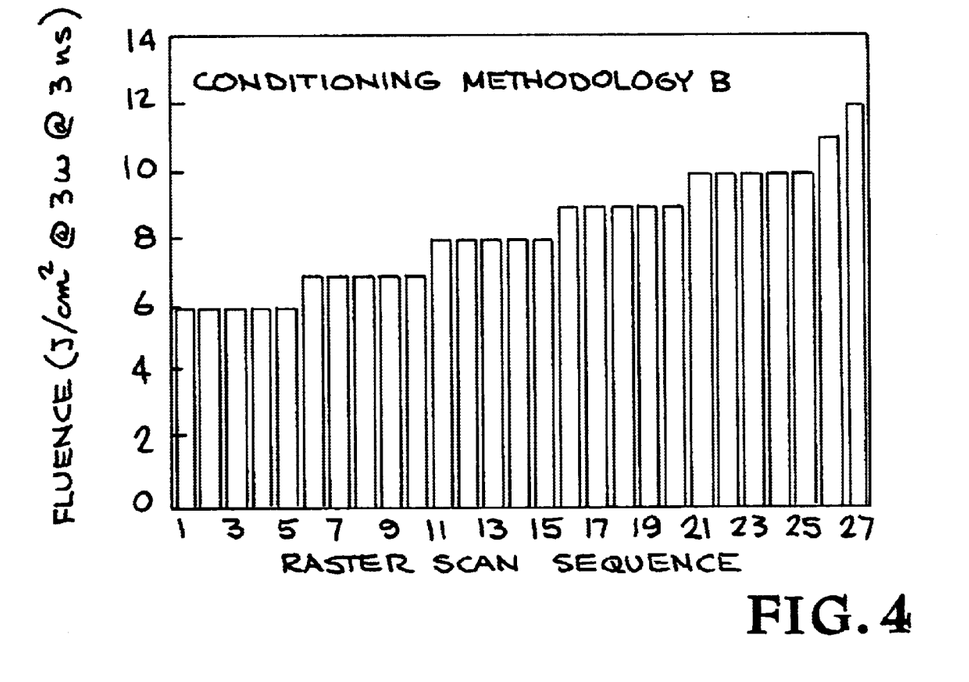
FIG. 4 is a graph showing conditioning methodology B.

FIG. 4 is a graph showing conditioning methodology B. Methodology B is a seven-step raster-conditioning process where the optic area of interest is exposed to five raster scans at a fluence of 6 J/cm$^2$, then five raster scans at 7 J/cm$^2$, then five raster scans at 8 J/cm$^2$, then five raster scans at 9 J/cm$^2$, then five raster scans at 10 J/cm$^2$, then one raster scan at 11 J/cm$^2$, and finally tested for damage at 12 J/cm$^2$.

Figure 5:
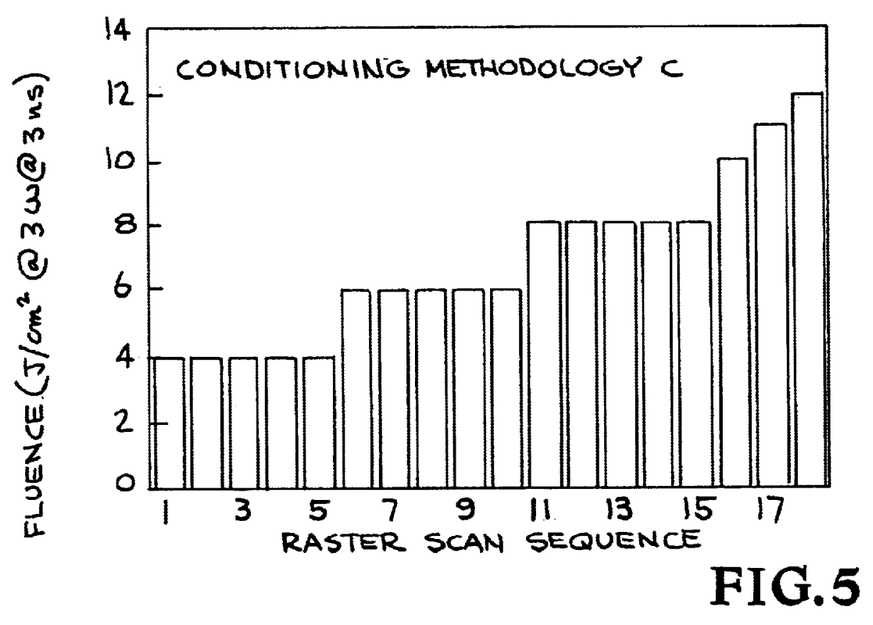
FIG. 5 is a graph showing conditioning methodology C.

FIG. 5. is a graph showing conditioning methodology C. Methodology C is a six-step raster-conditioning process where the optic area of interest is exposed to five raster scans at a fluence of 4 J/cm$^2$, then five raster scans at 6 J/cm$^2$, then five raster scans at 8 J/cm$^2$, then one raster scan at 10 J/cm$^2$, then one raster scan at 11 J/cm$^2$, and finally tested for damage at 12 J/cm$^2$.

Figure 6:
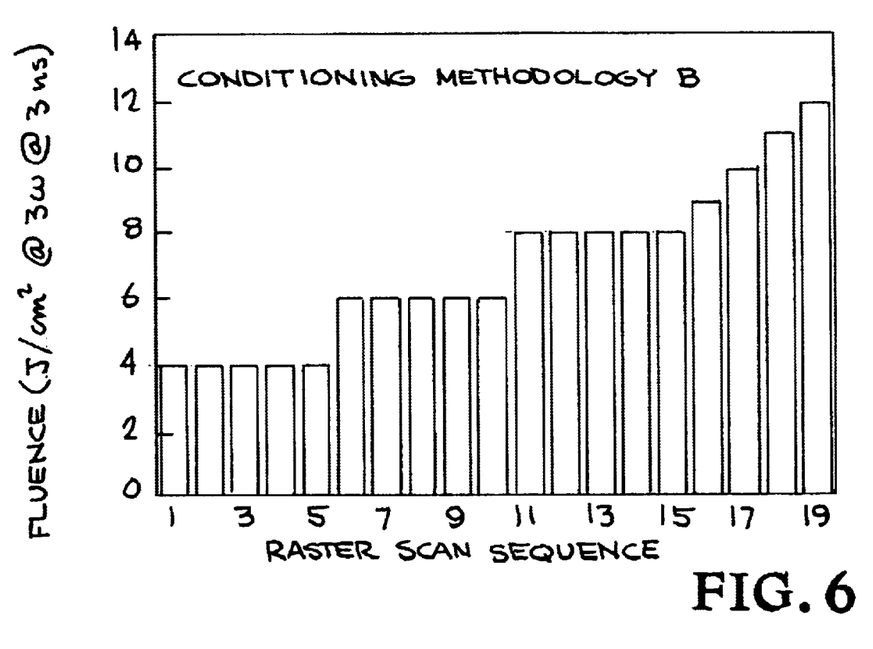
FIG. 6 is a graph showing conditioning methodology D.

FIG. 6 is a graph showing conditioning methodology D. Methodology D is a seven-step raster-conditioning process where the optic area of interest is exposed to five raster scans at a fluence of 4 J/cm$^2$, then five raster scans at 6 J/cm$^2$, then five raster scans at 8 J/cm$^2$, then one raster scan at 9 J/cm$^2$, then one raster scan at 10 J/cm$^2$, then one raster scan at 11 J/cm$^2$, and finally tested for damage at 12 J/cm$^2$.

Four separate tests using the laser conditioning methodologies shown in FIG. 3 to FIG. 6 were applied to three different fused silica optics samples from the same vendor (Vendor A). Sample 1 is a sample that was exposed to a non-clean room environment, and is thus expected to be possibly contaminated with particulates from dust. Samples 2–4 are clean samples that have experienced in the worst case a class-1000 clean room environment. The results of these tests are shown in FIG. 7.

Figure 7:
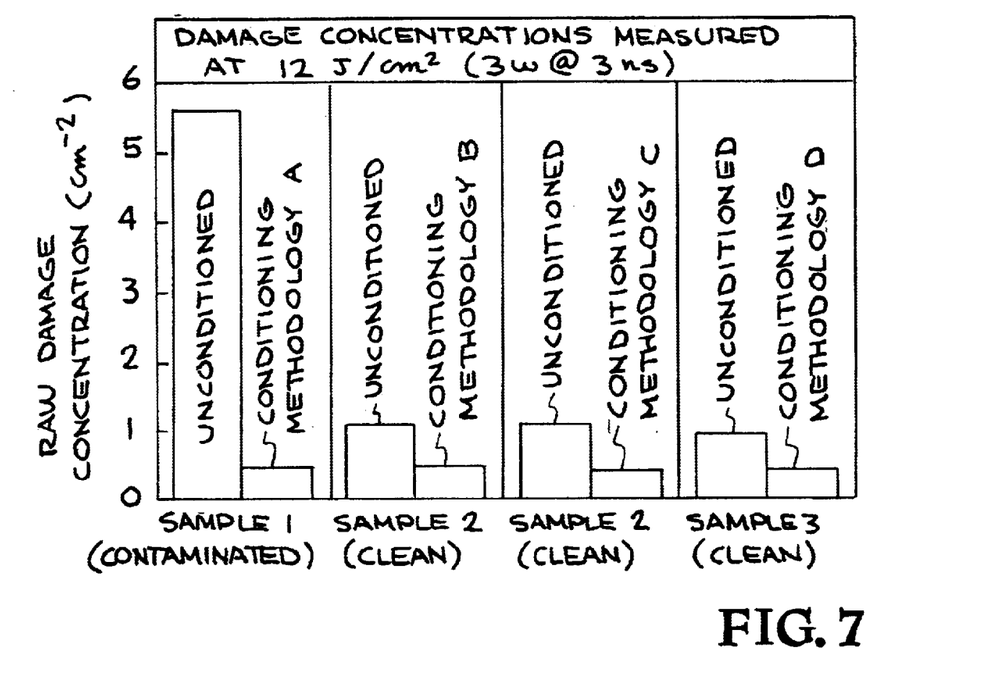
FIG. 7 is a graph showing the effect of 355-nm laser conditioning of fused silica optics (all from the same Vendor A) on the raw concentration of 355-nm laser-induced catastrophic surface damage at 12 J/cm$^2$. The damage concentrations represent measurements taken for a Gaussian-shaped laser beam profile that has been raster scanned with a step size corresponding to 50% FWHM beam overlap.

FIG. 7 is a graph showing the effect of 355-nm laser conditioning of fused silica optics (all from the same Vendor A) on the raw concentration of 355-nm laser-induced catastrophic surface damage at 12 J/cm$^2$. The damage concentrations represent measurements taken for a Gaussian-shaped laser beam profile that has been raster scanned with a step size corresponding to 50% FWHM beam overlap.

The damage concentration for the unconditioned Sample 1 corresponds to an area of 16 cm$^2$ raster scanned at a fluence of 12 J/cm$^2$, producing 90 damage sites. As expected, the damage concentration of the unconditioned Sample 1 is large because of absorption of UV laser light by the particulate contaminants. When a different test area of the same size 16 cm$^2$ in Sample 1 is conditioned according to methodology A, the number of damage sites produced at 12 J/cm$^2$ was reduced to only 8. The damage initiation in the conditioned Sample 1 was reduced by a factor of 10 compared to the unconditioned Sample 1.

The damage concentration of the unconditioned Sample 2 is much less compared to that of the unconditioned Sample 1, as expected, even though both samples were manufactured and polished by Vendor A in exactly the same way. Sample 2 started out much cleaner and therefore had minimal externally introduced contamination. Nevertheless, when Sample 2 is conditioned according to methodology B, damage initiation was reduced by a factor of two compared to the unconditioned Sample 2. In the unconditioned Sample 2, an area of 32 cm$^2$ was raster scanned at a fluence of 12 J/cm$^2$, and produced 35 damage sites. In the conditioned Sample 2, a different area of 32 cm$^2$ was conditioned according to methodology B, then raster scanned at a fluence of 12 J/cm$^2$, and produced 15 damage sites. Note that the damage concentration on the conditioned Sample 2 is equal to the damage concentration on the conditioned Sample 1, suggesting that the conditioning has reduced the damage initiation to a level that is basically characteristic of the optics finishing process from Vendor A.

In another test of an unconditioned Sample 2, an area of 16 cm$^2$ was raster scanned at a fluence of 12 J/cm$^2$, and produced 17 damage sites. In another test of a conditioned Sample 2, a different area of 16 cm$^2$ was conditioned according to methodology C, then raster scanned at a fluence of 12 J/cm$^2$, and produced 7 damage sites. The reduction in damage initiation for Sample 2 conditioned according to methodology B was the same as that for Sample 2 conditioned according to methodology C, and the same as Sample 1 conditioned according to methodology A. The data suggests that the different conditioning methodologies have reduced the damage initiation to a level that is basically characteristic of the optics finishing process from Vendor A.

In the unconditioned Sample 3, an area of 32 cm$^2$ was raster scanned at a fluence of 12 J/cm$^2$, and produced 31 damage sites. In the conditioned Sample 3, a different area of 32 cm$^2$ was conditioned according to methodology D, then raster scanned at a fluence of 12 J/cm$^2$, and produced 14 damage sites. The data confirms that clean samples from the same Vendor A have the same damage performance without conditioning. With conditioning, even with the different methodologies tested, the damage initiation has been reduced to the same level.

Figure 8:
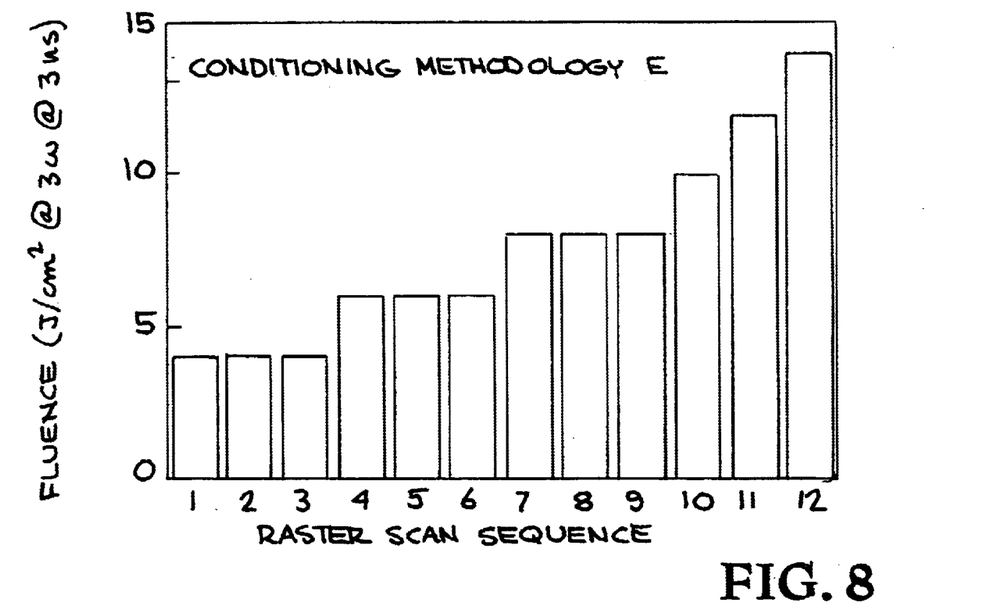
FIG. 8 is a graph showing conditioning methodology E.

To further prove the effectiveness of the UV laser conditioning method, a full-aperture (40 cm×40 cm) fused silica optic from Vendor B was tested. Because of the large amount of area involved, the conditioning methodology was modified to decrease the number of conditioning fluence steps. FIG. 8 is a graph showing conditioning methodology E. Methodology E is a six-step process where the optic area of interest is exposed to three raster scans at a fluence of 4 J/cm$^2$, then three raster scans at 6 J/cm$^2$, then three raster scans at 8 J/cm$^2$. The sample is then tested for damage at 10 J/cm$^2$, then at 12 J/cm$^2$, and at 12 J/cm$^2$.

Figure 9:
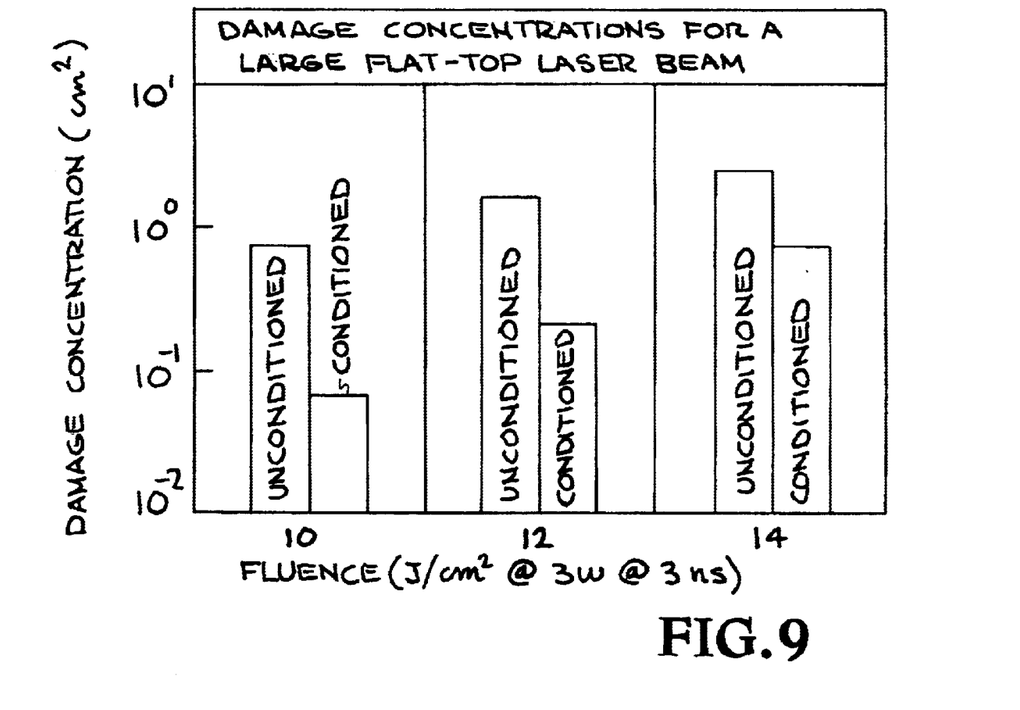
FIG. 9 is a graph showing the effect of 355-nm laser conditioning of fused silica optics (from Vendor B) on the concentration of 355-nm laser-induced surface damage sites at various fluences. The damage concentrations correspond to those produced by a large flat-top laser beam.

FIG. 9 is a graph showing the effect of 355-nm laser conditioning of a full-aperture fused silica optic (from Vendor B) on the concentration of 355-nm laser-induced surface damage sites at various fluences. The damage concentrations correspond to those produced by a large flat-top laser beam. The data for this optic shows a remarkable reduction in damage initiation at each fluence due to conditioning. At 10 J/cm$^2$, there was more than a factor of 10 reduction in damage initiation due to conditioning. At 12 J/cm$^2$, there was about a factor of 10 reduction in damage initiation due to conditioning even though the optic had already been thoroughly cleaned prior to testing. A close examination of the optic from Vendor B shows far fewer visible defects, such as scratches and digs, prior to testing compared to the optics samples from Vendor A. A smaller number of visible pretest defects usually is indicative that there are also less sub-surface defects on the optic. The data in FIG. 9 suggest that the effectiveness of UV laser conditioning increases with the quality of the finishing process for the optic. Thus there would be great advantage in combining the UV laser conditioning method in the present invention with a fabrication method such as disclosed by Nichols et al. in U.S. Pat. No. 6,099,389 that minimizes subsurface damage on the optic.

Not only is the remnant damage density significantly reduced by utilization of the 355 nm laser conditioning effect, but a class of non-catastrophic defect is also entirely eliminated. The so-called "gray haze" blemish, the development of a very large number of very small pit-like defects on the surface, is typically produced in UV optics of this type. UV laser conditioning treatment is found to be 100% effective in eliminating the formation of this type of surface perturbation.

Figure 10:
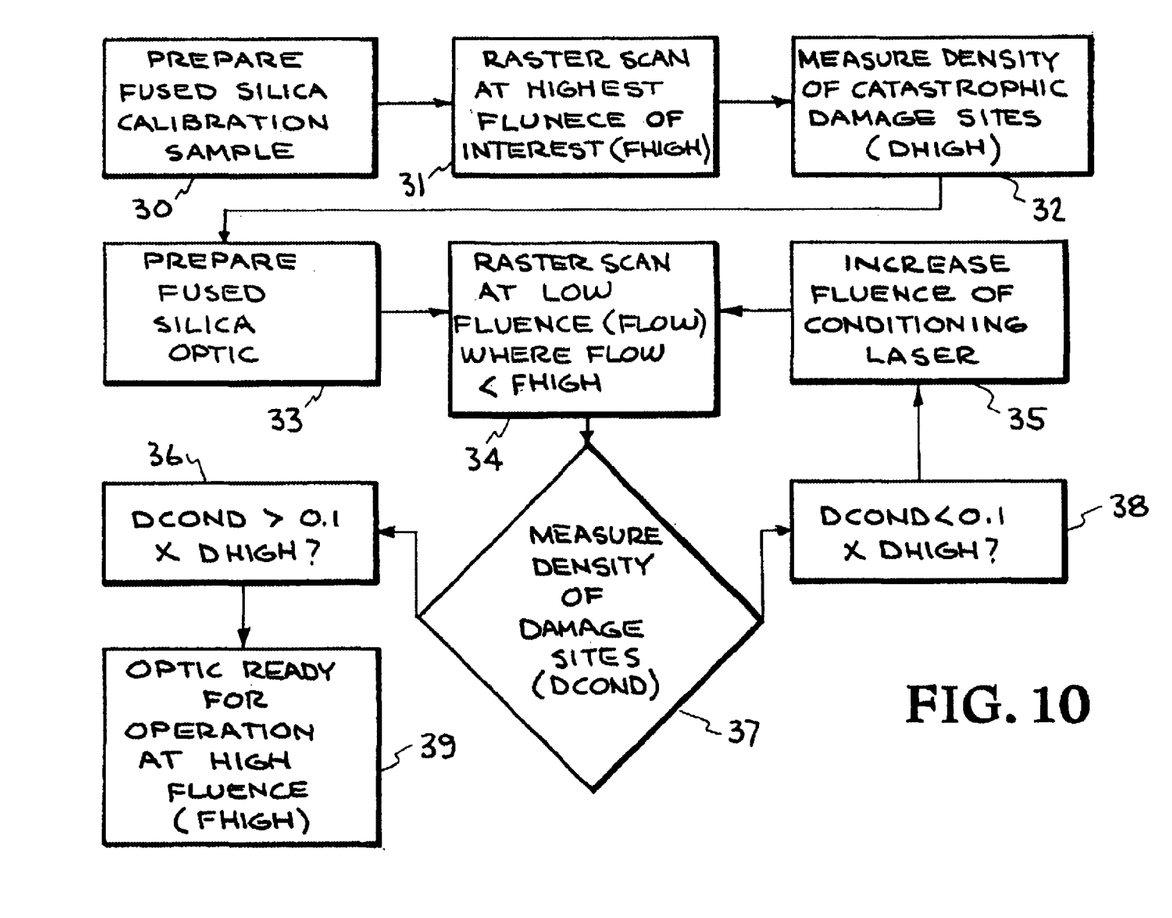
FIG. 10 is a flow chart of the steps in one embodiment of the present invention.

FIG. 10 is a flow chart of the steps in one preferred embodiment of the present invention. A calibration sample 30 from the same type of fused silica optic material and finish is used to first establish the levels of fluence that will be used for the conditioning. The calibration sample 30 is raster scanned once at the highest fluence ($F_{HIGH}$) of interest 31, for example, 12 J/cm$^2$. The unconditioned damage density ($D_{HIGH}$) is measured at this high fluence 32. Conditioning of the actual fused silica optic 33 then starts by raster scanning it at a low fluence ($F_{LOW}$), where $F_{LOW}$ is much less than $F_{HIGH}$ (for example, 4 J/cm$^2$) 34 and the resulting damage density ($D_{COND}$) is measured 37 and determined to be either zero or much less than a tenth of the unconditioned damage density $D_{HIGH}$ 38. The fluence of the conditioning raster scan is then increased by a small amount 35, for example from 4 J/cm$^2$ to 4.5 J/cm$^2$, and the conditioning cycle is repeated until the resulting damage density is slightly less than a tenth of the unconditioned damage density 36. The optic is then ready for operation at high fluence 39.

Figure 11:
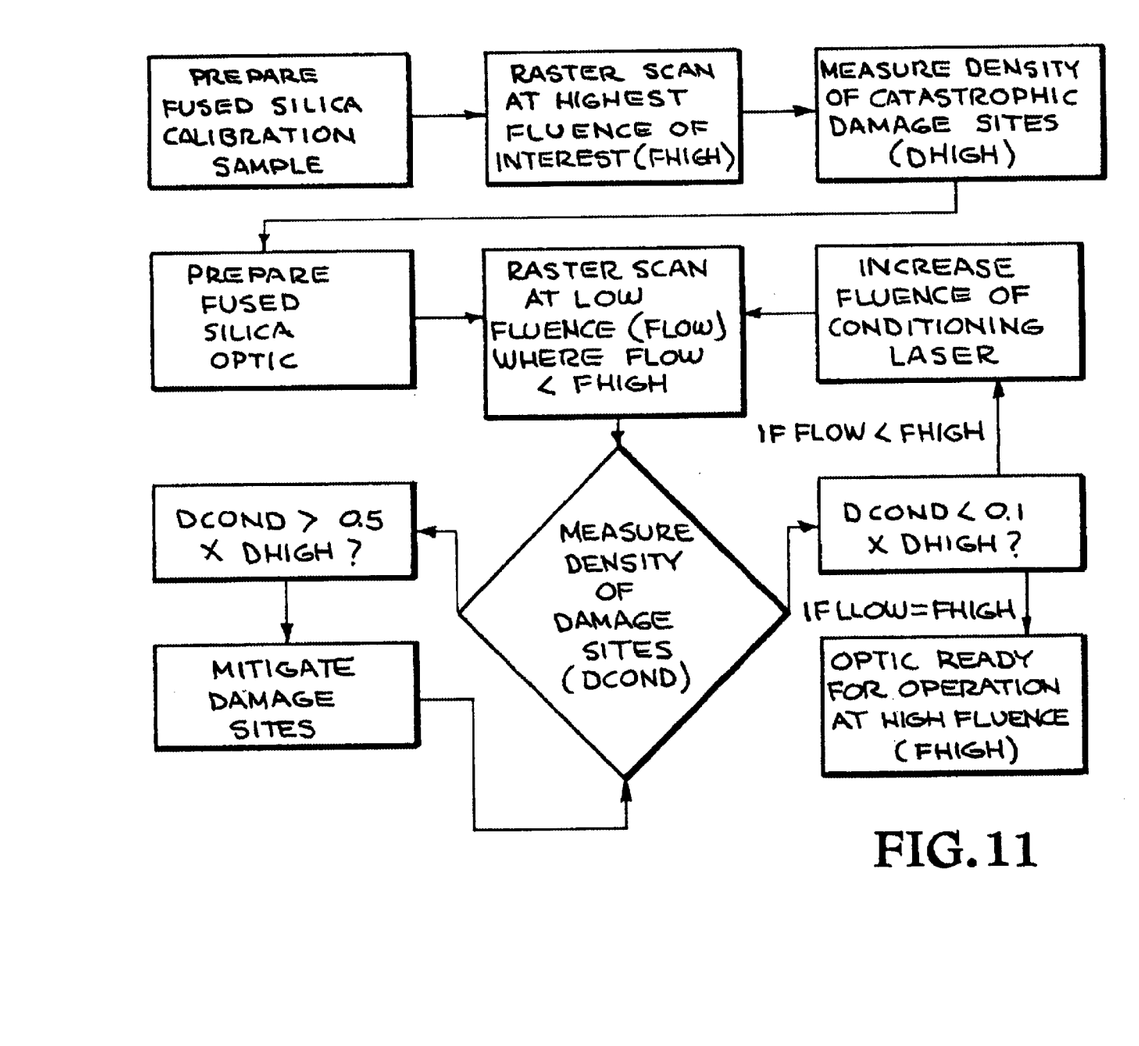
FIG. 11 is a flow chart of the steps in another embodiment of the present invention.

FIG. 11 is a flow chart of the steps in another preferred embodiment of the present invention. In this embodiment, any damage site that is produced during the conditioning process is immediately mitigated to prevent damage growth upon exposure to the next conditioning cycle. Such damage growth mitigation method is disclosed in a patent application by Brusasco et al., entitled "CO$_2$ laser and plasma microjet process for improving laser optics." A calibration sample 40 from the same type of fused silica optic material and finish is used to first establish the levels of fluence that will be used for the conditioning. The calibration sample 40 is raster scanned once at the highest fluence ($F_{HIGH}$) of interest 41, for example, 12 J/cm$^2$. The unconditioned damage density ($D_{HIGH}$) is measured at this high fluence 42. Conditioning of the actual fused silica optic 43 then starts by raster scanning it at a low fluence ($F_{LOW}$), where $F_{LOW}$ is much less than $F_{HIGH}$ (for example, 4 J/cm$^2$) 44 and the resulting damage density ($D_{COND}$) is measured 47 and determined to be either zero or much less than a tenth of the unconditioned damage density $D_{HIGH}$ 48. The fluence of the conditioning raster scan is then increased by a small amount 45, for example from $_4$ J/cm$^2$ to 4.5 J/cm$^2$, and the conditioning cycle is repeated until the resulting damage density is slightly less than a tenth of the unconditioned damage density 46. If the number of damage sites is determined to be greater than half of the unconditioned damage density 46, the damage sites on the optic are mitigated 49 to prevent growth of these damage sites upon exposure to the next conditioning cycle 44, 45. When the highest fluence of interest has been reached, the optic is then ready for operation at high fluence 50.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of conditioning fused silica optics to reduce damage associated with absorption when said fused silica optics are operated in an environment where they will be exposed to high-power ultraviolet light having a wavelength of about 360 nm or less, comprising the steps of:
   irradiating said fused silica optics with a conditioning laser beam of about 360 nm wavelength or less,
   irradiating said fused silica optics in successive irradiating steps in ramp-like fashion, and
   irradiating said fused silica optics with successive irradiating steps applied in increasingly higher fluences to reduce damage associated with absorption.

2. The method of claim 1 wherein said step of irradiating said fused silica optics with a conditioning laser beam of about 360 nm wavelength or less is conducted with a conditioning laser beam with a wavelength in the range of 360 nm to 150 nm.

3. The method of claim 2 wherein said step of irradiating said fused silica optics with a conditioning laser beam of about 360 nm wavelength or less is conducted with a conditioning laser beam of approximately 355 nm.

4. The method of claim 3 wherein said step of irradiating said fused silica optics with a conditioning laser beam of approximately 355 nm wavelength is conducted with substantially less than the fluence that could cause more than half the density of catastrophic damage sites in an unconditioned optic.

5. The method of claim 4, wherein said successive irradiating steps are continued until the density of catastrophic damage on said fused silica optics is expected to be reduced by at least a factor of 2.

6. The method of claim 5, wherein said high-power ultraviolet light having a wavelength of about 360 nm or less is also produced by said conditioning laser beam.

7. The method of claim 5, wherein said high-power ultraviolet light having a wavelength of about 360 nm or less is produced by an operating laser beam that is different from said conditioning laser beam.

8. The method of claim 7, wherein said operating laser beam has a wavelength at or near the wavelength of said conditioning laser beam.

9. The method of claim 7, wherein said operating laser beam has a pulse length that is shorter than the pulse length of said conditioning laser beam.

10. A method as in claim 7, wherein said operating laser beam has a pulse length that is longer than the pulse length of said conditioning laser beam.

11. A method of conditioning fused silica optics to reduce damage associated with absorption and operating said fused silica optics, comprising the steps of:
   conditioning irradiating said fused silica optics with a conditioning laser beam of about 360 nm wavelength or less,
   conditioning irradiating said fused silica optics in successive irradiating steps in ramp-like fashion,
   conditioning irradiating said fused silica optics with successive irradiating steps applied in increasingly higher fluences to reduce damage associated with absorption, and operating said fused silica optics in an environment where it is exposed to high-power ultraviolet light having a wavelength of about 360 nm or less.

12. The method of claim 11 wherein said step of irradiating said fused silica optics with a conditioning laser beam of about 360 nm wavelength or less is conducted with a conditioning laser beam with a wavelength in the range of 360 nm to 150 nm.

13. The method of claim 12 wherein said step of conditioning irradiating said fused silica optics with a conditioning laser beam of about 360 nm wavelength or less is conducted with a conditioning laser beam of approximately 355 nm.

14. The method of claim 13 wherein said step of conditioning irradiating said fused silica optics is conducted with substantially less than the fluence that could cause more than half the density of catastrophic damage sites in an unconditioned optic.

15. The method of claim 14, wherein said successive conditioning irradiating is continued until the density of catastrophic damage on said fused silica optics is expected to be reduced by at least a factor of 2.

16. The method of claim 11, wherein said high-power ultraviolet light is produced by an operating laser beam operated at wavelengths of about 360 nm or less.

17. The method of claim 16, wherein said operating laser beam is different from said conditioning laser beam.

18. The method of claim 17, wherein said operating laser beam has a wavelength at or near the wavelength of said conditioning laser beam.

19. The method of claim 17, wherein said operating laser beam has a pulse length that is shorter than the pulse length of said conditioning laser beam.

20. A method as in claim 17, wherein said operating laser beam has a pulse length that is longer than the pulse length of said conditioning laser beam.

21. The method of claim 16, wherein said operating laser beam is also said conditioning laser beam.

* * * * *